May 22, 1962 T. CARRIGAN 3,035,447
CENTERING DEVICE FOR WHEEL BALANCER
Filed July 24, 1956 2 Sheets-Sheet 1

INVENTOR
TRACY CARRIGAN
BY Hans G. Hoffmeister
ATTORNEY

May 22, 1962 T. CARRIGAN 3,035,447
CENTERING DEVICE FOR WHEEL BALANCER
Filed July 24, 1956 2 Sheets-Sheet 2
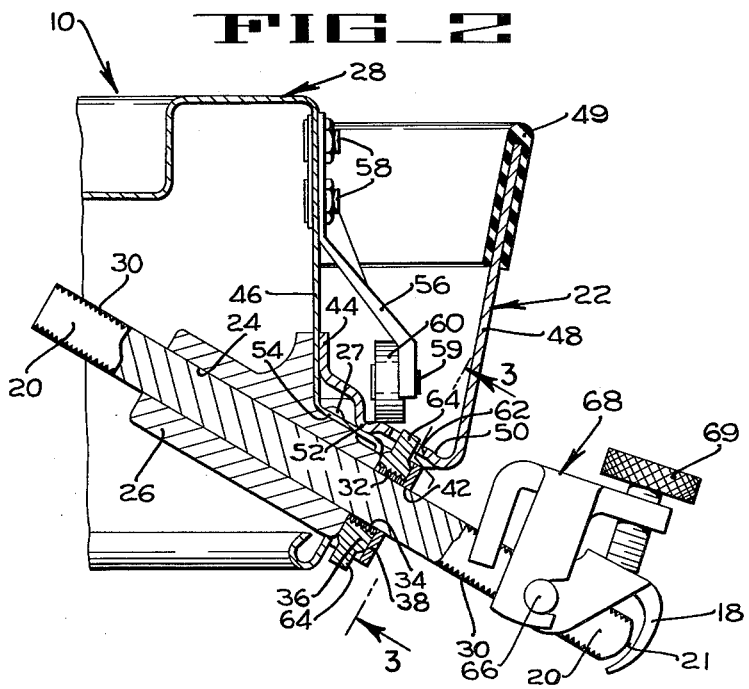
FIG_2
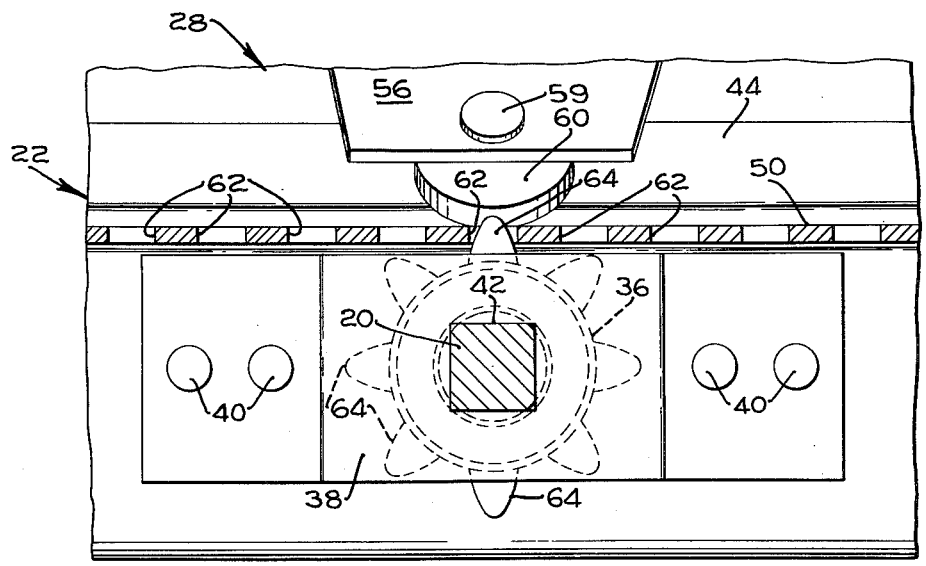
FIG_3
INVENTOR
TRACY CARRIGAN
BY Hans G. Hoffmeister
ATTORNEY

United States Patent Office 3,035,447
Patented May 22, 1962

3,035,447
CENTERING DEVICE FOR WHEEL BALANCER
Tracy Carrigan, Lansing, Mich., assignor to FMC Corporation, a corporation of Delaware
Filed July 24, 1956, Ser. No. 599,709
2 Claims. (Cl. 73—458)

This invention pertains to a wheel balancer of the type disclosed in Patent No. 2,780,939, granted to B. H. Kellogg on Feb. 12, 1957. More particularly the present invention is directed to a device for automatically centering the wheel balancer on a wheel of an automotive vehicle when the balancer is mounted thereon.

When balancing a wheel in the manner described in the above identified Kellogg patent, it is extremely important that the wheel balancer be mounted with its central axis coaxial with the rotational axis of the wheel since any eccentricity of the balancer relative to the wheel will introduce an artificial unbalance and cause a false reading to be obtained.

It is therefore one object of the present invention to provide an automatic centering device for a wheel balancer.

A further object is to provide a centering device for a wheel balancer which is relatively inexpensive, efficient and easy to operate.

These and other objects and advantages of the present invention will become apparent from the following description and accompanying drawings in which:

FIG. 2 is a section taken generally on line 2—2 of FIG. 1.

FIG. 3 is a section taken on line 3—3 of FIG. 2.

Figure 1:
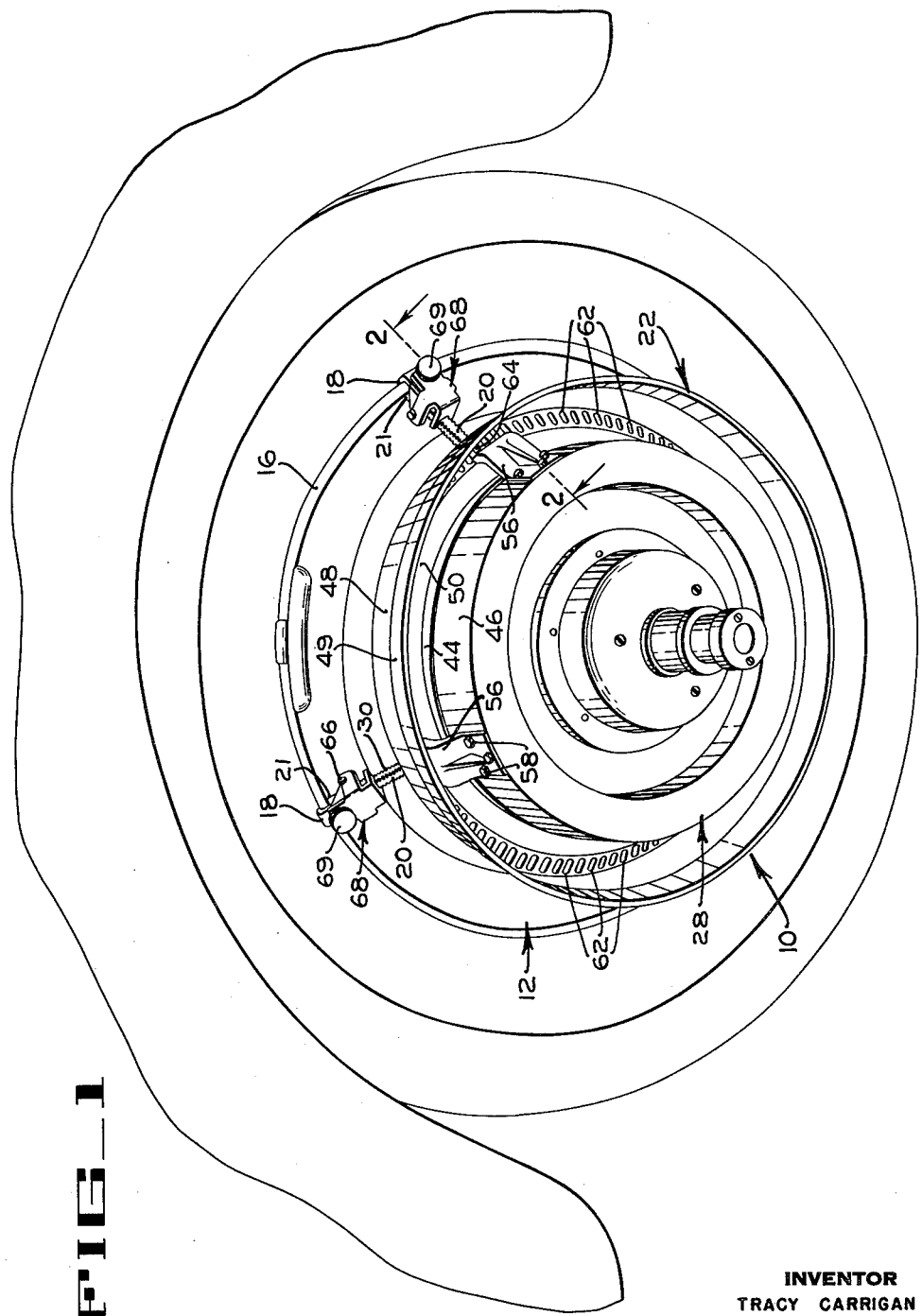
FIG. 1 is a perspective view of a wheel balancer mounted on a vehicle wheel.

In FIG. 1 the reference numeral 10 indicates generally a wheel balancer, of the type described in the above mentioned Kellogg patent, secured to the wheel 12 of an automobile. The balancing unit or assembly 10 is clamped to the rim 16 of the wheel 12 by four clamps 18 mounted on the ends of four studs 20 which protrude outwardly from the unit 10 at points spaced equally about the periphery thereof. It is obvious that if the studs 20 protrude equal distances from the periphery of the unit 10, the unit will be concentric with the wheel 12. In order to insure that the studs 20 are moved equal distances when adjusting to different size wheels, a ring 22 and associated mechanism is provided for projecting or retracting all of the studs the same distance simultaneously upon rotation of the ring 22 in one or the other direction.

All of the studs 20, their mountings and their driving sprockets are of the same construction and therefore only one will be described in detail. Referring now to FIGS. 2 and 3, the stud 20 is square in cross section and is slidably received within a suitable square bore 24 in a guide block 26 fixed by rivets 27 to the housing 28 of the unit 10. The corners of the stud 20 are formed with a screw thread 30 which threadedly engages internal threads 32 in the central aperture 34 of a sprocket member 36 held closely adjacent the outer end of the guide block 26 by a bracket 38 mounted on the peripheral wall of the housing 28 by a plurality of rivets 40. The bracket 38 is provided with a square opening 42 (FIG. 3) through which the stud 20 projects.

The ring 22 is generally U-shaped in cross section as seen in FIG. 2. The inner annular flange 44 of the ring is in contact with the outer vertical portion 46 of the housing 28. The outer annular flange 48 of the ring 22 is generally parallel to, but spaced outwardly from, the flange 44 and is joined thereto by the downwardly and outwardly sloping bottom section 50. A sheath 49 of rubber or similar material encloses the upper edge of the flange 48 and provides a convenient gripping surface for grasping the ring 22.

The bottom section 50 is provided with a downwardly projecting annular rib 52 which rests against a downwardly and outwardly sloping surface 54 of the housing 28. A bracket 56 is fixed to the outer surface of the vertical portion 46 of the housing 28 above the upper edge of the inner flange 44 of the ring 22 by a plurality of bolts 58. The bracket 56 extends downwardly within the U-shaped ring 22 and carries a pin 59 which rotatably supports a roller 60 the peripheral portion of which bears against the upper surface of the rib 52 to maintain the ring 22 in place. It will be understood that there are four of these brackets 56 and rollers 60, one adjacent each of the studs 20.

The bottom section 50 of the ring 22 is provided with a plurality of circumferentially spaced openings 62 which mesh in driving relation with teeth 64 on each of the driving sprockets 36 (FIGS. 2 and 3), so that the studs 20 may all be projected or retracted the same distance simultaneously by rotating the ring 22 relative to the housing 28.

Each of the studs 20 is provided with one of the clamps 18 previously mentioned. Each clamp is pivotally connected to its associated stud 20 by a pivot pin 66, and is adapted to be held in its wheel flange engaging position by a clamp lock assembly 68 of the type disclosed in the copending application of Tracy Carrigan, Serial No. 585,837, filed May 18, 1956, now Patent No. 2,927,760, and entitled "Mechanical Connector."

In mounting the wheel balancer on the wheel of a vehicle in preparation for balancing the same, the clamp locks 68 (FIG. 2) are removed and the clamps 18 are rotated away from the ends of the studs 20. The balancer is then placed with the tips of two adjacent studs 20 against the inner surface of the flange 16 on the wheel 12 (FIG. 1), and the ring 22 is turned in the direction to retract the studs 20 until the tips of remaining studs can be swung inside of the wheel flange 16. The ring 22 is then rotated in the opposite direction until the tips 21 of all four studs 20 are in solid engagement with the inner surface of the flange 16 in the manner illustrated in FIG. 1 thus centering the wheel balancing assembly 10 with respect to the wheel 12. The clamps 18 are then rotated to flange engaging position between the flange 16 and the tire mounted thereon, and the clamp locks 68 are installed and the lock screws 69 are tightened to firmly lock the clamps 18 in position on the wheel flange 16.

While I have described a preferred embodiment of the present invention, it should be noted that various modifications may be made without departing from the spirit of the invention as defined in the appended claims.

Having thus described my invention, what I claim and desire to secure by Letters Patent is:

1. Mechanism for attaching a wheel balancer to a wheel comprising a wheel balancer housing having a peripheral cylindrical wall and an axially inner generally radially outwardly extending flange portion, a plurality of generally radial threaded centering studs mounted in said housing axially inwardly of said flange portion, means on said studs for engagement with the rim of a wheel, sprockets mounted on said housing and threaded on said studs, a centering ring journalled on said cylindrical wall, said ring having a flange portion overlying said housing flange portion and formed with sprocket drive means whereby rotation of said ring on said housing effects radial adjustment of said centering studs, the flange portion of said ring having abutment means engaging the outer face of said housing flange portion, and rollers mounted on said housing and engaging said ring flange portion adjacent said abutment means for axially confining the ring on the housing.

2. Mechanism for attaching a wheel balancer to a wheel comprising a wheel balancer housing having a peripheral cylindrical wall and an axially inner generally radially outwardly extending flange portion, a plurality of generally radial threaded centering studs mounted in said housing axially inwardly of said flange portion, means on said studs for engagement with the rim of a wheel, sprockets mounted on said housing and threaded on said studs, a centering ring journalled on said cylindrical wall, said ring having a flange portion overlying said housing flange portion and formed with sprocket drive means whereby rotation of said ring on said housing effects radial adjustment of said centering studs, the flange portion of said ring having abutment means engaging the outer face of said housing flange portion, and means mounted on said housing and engaging said ring flange portion adjacent said abutment means for axially confining the ring on the housing.

References Cited in the file of this patent

UNITED STATES PATENTS

| | | |
|---|---|---|
| 1,506,977 | Dichwolf et al. | Sept. 2, 1924 |
| 2,402,041 | Greenleaf et al. | June 11, 1946 |
| 2,780,939 | Kellogg | Feb. 12, 1957 |

FOREIGN PATENTS

| | | |
|---|---|---|
| 161,950 | Australia | Mar. 15, 1955 |
| 746,520 | Great Britain | Mar. 14, 1956 |